UNITED STATES PATENT OFFICE 2,486,533

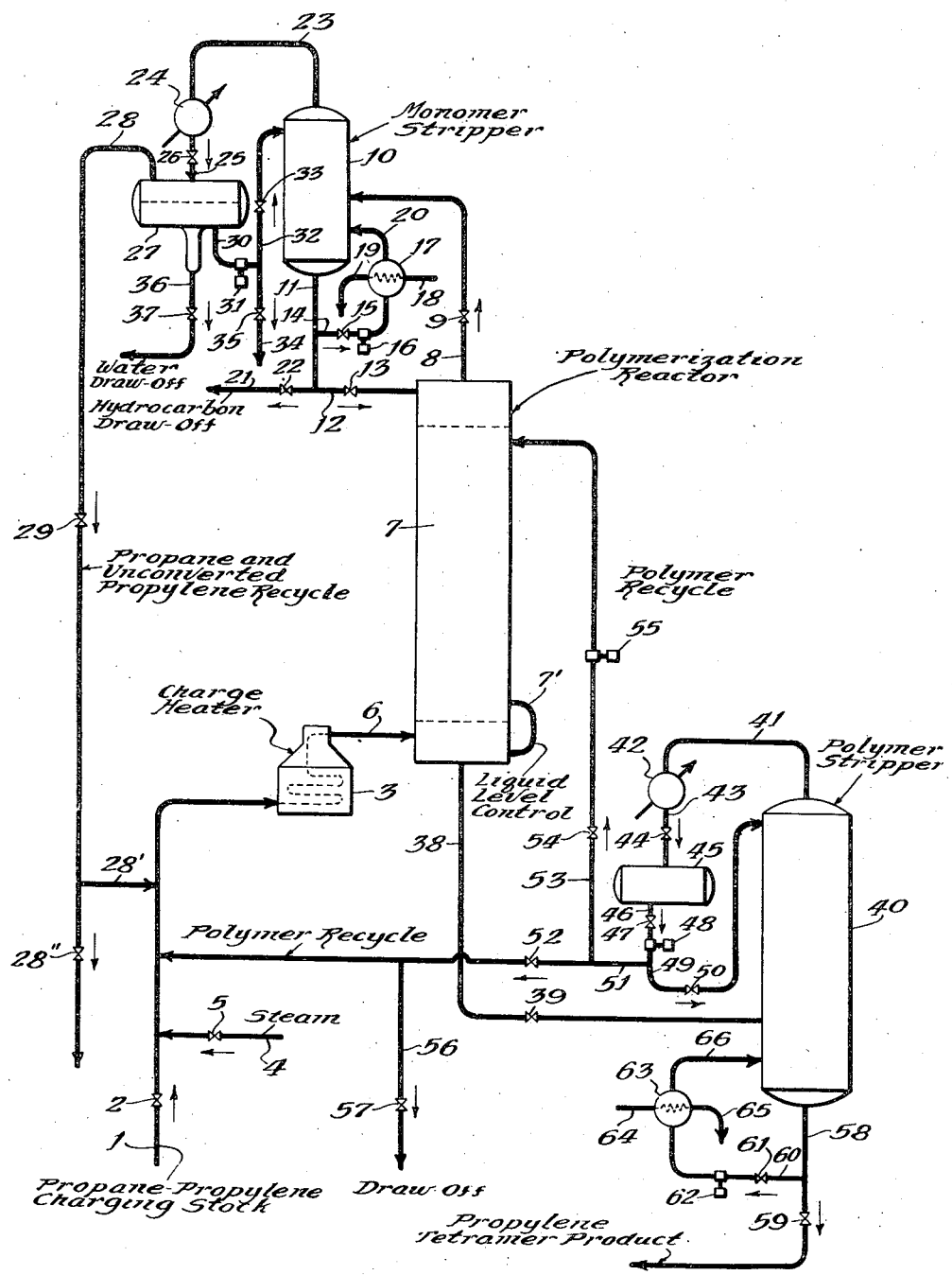

PROCESS FOR PRODUCING SELECTIVE POLYMERS

Harrison C. Mayland, La Grange, and Clarence G. Gerhold, Riverside, Ill., assignors to Universal Oil Products Company, Chicago, Ill., a corporation of Delaware Application January 29, 1947, Serial No. 725,028

8 Claims. (Cl. 260—683.15)

This invention relates to the polymerization of olefinic hydrocarbon monomers for the production therefrom of selective polymers having a definite molecular weight or a particular range of molecular weights suitable for a specific purpose. More specifically the invention concerns the polymerization of olefin monomers by means of a particularly advantageous arrangement of apparatus and utilizing a process flow in which intermediate polymers are converted to a polymer of a particularly desired molecular weight, thereby eliminating said intermediate polymers from the reaction product and increasing the yield of desired polymers.

We have found that in the polymerization of olefin monomers to form an olefin polymer of a particularly desired molecular weight, if the polymers of lesser molecular weight than the desired product are commingled with the monomer charging stock and recycled to the polymerization reactor, an increased yield of the desired higher polymer is obtained by the resultant condensation of additional units of the monomer olefin with the lower polymers contained in the recycled stream.

It is the primary object of the present invention to provide a polymerization process in which the intermediate polymers formed in the polymerization reaction having lower molecular weight than the polymer desired, are recycled to effect an increase in the yield of the desired polymer product.

A further object of the invention is to provide continuous arrangement of the required units of apparatus necessary to effect the polymerization reaction and separation of the products thereof, where said apparatus comprises a centrally located polymerization reactor, a monomer stripping section positioned above the polymerization reactor section and a polymer stripping section situated below the polymerization reactor, said arrangement providing a means for readily transferring the intermediate polymers from their respective separating zones to the polymerization reaction zone.

In one of its embodiments, the present invention refers to a process for producing an olefinic polymer of the formula: $(C_nH_{2n})_x$ wherein $n$ represents a whole number preferably of from 3 to 5, inclusive, and $x$ represents an integer greater than 2, which comprises polymerizing an olefinic monomer represented by the formula: $C_nH_{2n}$, in the presence of a solid polymerization catalyst at reaction conditions such that both a primary liquid and a primary vapor phase are present in the polymerization reactor, stripping from said primary liquid phase a vapor containing polymers of the formula: $(C_nH_{2n})_{x-y}$, where $y$ is a whole number less than $x$, passing said last mentioned vapor into said polymerization reactor wherein said polymers contact additional monomer and other polymers to form increased amounts of the desired $(C_nH_{2n})_x$ polymer, cooling said primary vapor phase to condense hydrocarbons less volatile than said olefinic monomer and returning said hydrocarbons to said polymerization reactor.

In accordance with a more specific embodiment of the invention, the present process comprises polymerizing propylene monomer in the presence of a solid phosphoric acid catalyst, hereinafter more fully described, at conditions sufficient to form at least dimers, trimers and tetramers of said propylene, maintaining the pressure and temperature conditions in the catalyst-containing polymerization reactor such that both a primary liquid phase and a primary vapor phase are present therein, separating said primary liquid phase and increasing its temperature to strip therefrom polymers having a greater volatility than propylene tetramer, passing said last mentioned polymers into said polymerization reactor, withdrawing propylene tetramer, decreasing the temperature of said primary vapor phase to condense hydrocarbons less volatile than said propylene monomer and returning said hydrocarbons to said polymerization reactor.

Other embodiments of the invention referring to specific polymerization catalysts and olefinic charging stocks and to alternative means of effecting the present process will be hereinafter described in greater detail in the following further description of the invention.

The olefinic monomers utilizable as charging stock in the present process, although theoretically, may comprise any polymerizable monoolefinic hydrocarbon, we prefer to utilize those olefin monomers which not only form stable polymers at relatively high temperatures but which, on the other hand do not polymerize to form excessively high molecular weight normally solid products such as waxes, resins, viscous tars, etc. In general, said preferred olefin monomers comprise the olefinic hydrocarbons represented by the formula: $C_nH_{2n}$, wherein $n$ is a whole number of from 3 to about 5 inclusive. The preferred type of olefin monomer charging stock utilizable in the present process depends upon the use to be made of the product. For example, in the production of motor fuel components, the charge may contain any one or more of the various olefin classes such as tertiary or normal olefins; further, the charge may comprise a mixture of monomers having various molecular weights including components of more than five carbon atoms per molecule such as the olefinic gaseous fraction from a thermal or catalytic cracking process. For the production of olefinic polymers having a relatively straight chain configuration, required, for example in the preparation of detergents of the alkyl aryl sulfonate type and of the long chain alcohol sulfate type, the preferred olefin monomer charge is a normal olefin (that is, a non-tertiary type). Other specific olefins or mixtures thereof may be employed for particular purposes, but it is not intended, in specifying the preferred monomers containing from 3 to about 5 carbon atoms per molecule to limit the application of the present process to said olefins exclusively. Since the process depends for its operation on the differences in boiling points of the various product polymers (hence, also the molecular weight), the lower molecular weight monomers, that is, olefins of from 3 to about 5 carbon atoms per molecule, are preferred, because the spread in boiling points between the monomer, dimer, trimer, etc. is not too great to make separation thereof feasible. The latter factor, however, may be overcome to some extent by the use of subatmospheric conditions in the separation zones, thereby reducing the boiling points of the products. Furthermore, the polymeric products of the higher molecular weight monomers, include a greater proportion of isomers, presenting a greater difficulty of separation into fractions containing polymers of similar molecular weights. For other reasons, ethylene is not a preferred olefinic charging stock, said reasons generally involving the factor of increased production of conjunct polymerization products (usually of saturated and/or cyclic character); ethylene, nevertheless is not specifically excluded as charging stock, since in the presence of certain solid polymerization catalysts and under selected conditions, the yield of olefinic polymers therefrom may be within a commercially feasible range.

The catalyst utilizable in the present invention for effecting polymerization of olefinic monomers according to the present method of operation are characterized broadly as "solid" polymerization catalysts. Although certain known liquid reagents have the ability to polymerize olefin monomers by means of processes not contemplated herein, the operation of the present process is necessarily dependent upon the polymerization catalyst being distributed in the polymerization zone in the form of discrete solid particles in order to allow the vapor and liquid phases present in the zone of the reaction to flow over and around the polymerization catalyst such that a vapor phase may be withdrawn continuously, if desired, from the top of the polymerization reactor and a liquid phase withdrawn substantially simultaneously, from the bottom of the polymerization zone containing said catalyst particles. The solid catalyst is preferably maintained in the reaction zone in the form of relatively large particles, (desirably of a spherical shape) to allow the liquid and vapor phase to flow freely through the polymerization zone in countercurrent relationship. For this purpose, the catalyst particles are usually maintained in the reactor as a stationary bed, although it is also within the scope of the present operation to introduce the catalyst in the form of a finely divided powder with the charging stock into the polymerization reactor at a relatively high velocity such that the catalyst particles remain suspended therein with the gaseous charge.

Among the polymerization catalysts utilizable in the present process are included; the pyrophosphoric acid salts of the metallic elements in the right hand columns of groups I and II of the periodic table, particularly of the metals; zinc, cadmium, copper and mercury, the salts being desirably deposited upon carrying or spacing materials such as the inert forms of silica, alumina, fire brick, kieselguhr, etc. Other utilizable catalysts, particularly for fixed or moving bed polymerization operations, comprise the refractory oxides of metals of group IV of the periodic table composited with or deposited on silica and/or alumina. Typical of these are silica-zirconia composites with or without added alumina. A particularly preferred solid polymerization catalyst is the composite known generally in the art as the "solid phosphoric acid catalyst" consisting of a pre-calcined mixture of a suitable phosphoric acid, such as pyrophosphoric acid and a siliceous adsorbent such as kieselguhr, the preparation of which is described in United States Patent No. 1,993,513 and others. The latter composite of a siliceous material and phosphoric acid is sometimes referred to in the art as a silicophosphate composition. Of the above generally broad group of solid polymerization catalysts, I prefer to employ the so-called solid phosphoric acid catalyst and the metallic pyrophosphate salts, the two types (that is, the silico-phosphate and the metallic pyrophosphates) being referred to herein as phosphate-containing catalysts.

The operation of the present process to obtain the special advantages inherent therein is based upon several essentially basic principles including:

(1) Recycling to the polymerization reactor those polymers separated from the total polymerization product which are of lower molecular weight than the desired polymer product. The recycling feature results in contacting said lower polymers with additional monomer olefins in the presence of the polymerization catalyst, thereby causing the further condensation of the polymer olefins with one or more molecules of the monomer olefin to form increased yields of the desired polymer. In the production of propylene tetramer, for example, fresh propylene-containing charge is subjected to polymerization in a central reactor at conditions sufficient to maintain vapor phase as well as liquid phase within the reactor. The vapor phase, containing unconverted $C_3$ hydrocarbons, propylene dimer and usually minor amounts of propylene trimer, depending upon the temperature of the vapor phase, is fractionated in the monomer stripping unit of the apparatus, or alternatively, in the upper cooler portions of the polymerization reactor, to cause liquefaction of the hydrocarbons of greater molecular weight than propylene, such as the dimer and trimer when the latter are contained in the vapor phase. The liquefied hydrocarbons of greater molecular weight than propylene are recycled to the polymerization reactor where they contact the polymerization catalyst and additional monomer (propylene), dimer and/or trimer to condense further into higher molecular weight polymers. The removal of the vapor phase from the polymerization zone at a high temperature and return of at least a portion thereof as liquefied hydrocarbons at a lower temperature than the polymerization temperature removes heat from the polymerization zone, thereby dissipating the exothermic heat of reaction liberated in the polymerization process and provides a convenient means of controlling the polymerization temperature at the desired level by regulating the amount and the temperature of the recycled liquid return. The return of liquid polymers to the top of the polymerization zone containing the solid polymerization catalyst effects a further advantage in that the liquid hydrocarbons entering the top of the catalyst bed dissolve certain catalyst-deactivating deposits such as resins and carbonaceous materials which under normal polymerizing conditions accumulates on the surface of the catalyst during the polymerization reaction. Utilizing this method of operation therefore the catalyst is maintained in an active condition for greater periods of operation.

(2) The process is limited to the production of a polymer having a molecular weight at least 3 times the molecular weight of the monomer; that is, the polymer product formed by the polymerization reaction must contain at least 3 times the number of carbon atoms as are present in the olefin monomer charge to the polymerization reaction. In terms of empirical formulae, the polymer product is represented by the formulae: $(C_nH_{2n})_x$, where $C_nH_{2n}$ represents the olefin monomer charge and $x$ is a whole number of at least 3 in value. Although the molecular weight of the product polymer is theoretically unlimited, and $x$ of the above formula may be any selected value greater than 2, the product is nevertheless limited in molecular weight for practical reasons, since the boiling point of the polymer is dependent upon its molecular weight and under conditions in which normally solid polymers would be obtained, the operation of the process would be restricted by the difficulty in handling and vaporizing normally solid polymers of high molecular weight. It is thus inherent in the present process that a lower polymer is removed from the polymerization reactor along with unconverted monomer as a vapor phase and that substantially all polymers contained in the vapor phase are separated from the monomer and returned to the polymerization zone as a liquid fraction. It is also inherent in the process that the polymers higher than the polymers removed as the primary vapor phase (for example the trimers and tetramers) including the desired polymer product, are removed from the polymerization reactor as a primary liquid phase. The components of the liquid fraction thus removed, having a molecular weight less than the desired polymer, are subsequently vaporized from said liquid phase and returned to the polymerization reactor. If $(C_nH_{2n})_x$ represents the empirical formula of the desired polymer (where $x$ is a whole number greater than 2) then $(C_nH_{2n})_{x-y}$ (where $y$ is a whole number less than $x$ and greater than 1) represents the polymers vaporized from the primary liquid fraction and recycled into the polymerization reactor from the polymer stripping section.

(3) The molecular weight of the product polymer ultimately separated from the process is limited by the boiling point (hence also the molecular weight) of the polymers recycled to the polymerization reactor separated from the primary liquid phase. The conditions maintained in the polymerization reactor in order to have present therein the required liquid and vapor phases are necessarily determined by the boiling point at the operating pressure of said recycled fraction separated from the primary liquid phase and introduced into the reactor as recycle stock. Thus, if the polymerization temperature is fixed at 250° C., the polymer recycle fraction introduced into the polymerization reactor must boil below 250° C. at the operating pressure for the reasons stated above.

The process flow of the present invention, the apparatus for effecting the desired conversion and the embodiments of the invention will be described in greater detail in connection with the accompanying flow diagram. For purposes of simplifying the description, the polymerization process will be described with reference to the preferred monomeric olefin charging stock, (a $C_3$ hydrocarbon fraction containing propylene) and also with reference to the preferred polymerization catalyst, the granular solid phosphoric acid catalyst which is desirably maintained in the polymerization reactor as a fixed bed of catalyst in relation to the entering charging stock. It is to be understood, however, that in thus describing the diagram with reference to a specific catalyst and to a particular charging stock limited in composition to the preferred $C_3$, $C_4$ and $C_5$ hydrocarbons, it is nevertheless within the scope and disclosure of the present invention to utilize any of the above mentioned polymerization catalysts and to operate the process utilizing a charging stock containing olefins of greater molecular weight than the above preferred olefins and also to employ olefinic hydrocarbon mixtures, as for example, a fraction containing predominantly propylene with minor amounts of butenes, pentenes, hexenes and/or heptenes present therein.

Referring to the accompanying diagram, a propane-propylene containing charging stock, separated for example, from the gaseous effluent of a hydrocarbon conversion operation, such as a cracking process, is introduced under pressure into the process flow through line 1 containing valve 2 and is conveyed by means of said line 1 into a suitable heat exchange apparatus represented on the diagram as charge heater 3 wherein the $C_3$ charge is heated to such temperature as will maintain the polymerization temperature at the desired level. The charge is preferably heated above the polymerization temperature, especially when liquid reflux is recycled to the polymerization reactor, although under other conditions, the monomer charge need not be preheated.

The polymerization conditions are specified herein as being sufficient to maintain within the polymerization reactor both a primary liquid phase and a primary vapor phase, the temperature being mutually dependent upon the pressure and space velocity of the charge in the reaction zone. When polymerizing propylene, temperatures of from about 120° to about 350° C., preferably from about 150° to about 250° C., and superatmospheric pressures up to about 1000 pounds per square inch may be utilized. Under these conditions, space velocities of from about 0.1 to 10 volumes of olefin monomer charge per volume of catalyst per hour are desirable. The particular conditions selected, however, must necessarily be chosen on the basis of the primary requirement of maintaining the requisite vapor and liquid phases in the polymerization reactor, which may be determined by trial methods for the paritcular olefin monomer charged.

When the solid phosphoric acid catalyst is utilized in the polymerization zone, the phosphoric acid contained in the catalyst composite is maintained at the desired degree of hydration by introducing water vapor together with the charge to the polymerization reactor containing said catalyst, preferably in an amount within the range of from about 0.05 to about 1 per cent by weight of the hydrocarbon charge. In relation to the diagram herein described, the water vapor is introduced as steam through line 4 containing valve 5, said line 4 connecting with the hydrocarbon charging line 1.

The charge heated to the desired temperature exits heater 3 through line 6 and is introduced into polymerization reactor 7 at a point below the bed of polymerization catalyst, the propylene rising through the particles of solid catalyst and polymerizing by contact with the solid phosphoric acid catalyst. On contacting the charge with the catalyst and at the conditions specified for maintaining both a liquid and a vapor phase within the polymerization reactor, liquid polymers are formed which tend to gravitate downward through the catalyst bed and accumulate in the bottom of the reactor. The amount of liquid polymers present in the polymerization reactor is controlled by a liquid level control device (represented as 7' on the flow diagram), to prevent the gaseous hydrocarbon charge from exiting the reactor through polymer discharge line 38 leading from reactor 7. By maintaining a liquid level at the bottom of the reactor it is further provided that the liquid polymers of low molecular weight (for example, the dimers and trimers) accumulating in the liquid phase are vaporized by the entering propylene-containing charge and are carried in vapor state into the upper region of the polymerization reactor wherein they contact the polymerization catalyst to form higher polymers.

The primary vapor phase containing unconverted propylene, propane and low molecular weight polymers, such as dimers, and minor amounts of the trimer exits polymerization reactor 7 through line 8 containing valve 9 and enters monomer stripper 10 wherein the polymeric olefins contained in the vapor phase are condensed and separated from the C₃ hydrocarbons. For this purpose, the monomer stripper may be a bubble cap column for fractionating the hydrocarbons introduced thereto, or under certain conditions of operation, the apparatus may be simply a water cooled condenser operating at a sufficiently low temperature to liquefy only the polymers contained in the primary vapor phase, allowing a portion of the C₃ hydrocarbons to escape therefrom as a gaseous effluent. The stripper may further be operated at a superatmospheric pressure such that, if desired, the C₃ hydrocarbons may also be liquefied and returned to the polymerization reactor. Under usual operating conditions, however, the stripper is maintained at superatmospheric pressures and at these conditions may be cooled by ordinary cooling water at usual temperatures. At higher pressures and/or refrigeration, the entire primary vapor phase, including the C₃ hydrocarbons, may be liquefied and returned as recycle to reactor 7. If desired, a compressor may be inserted in line 8, although not shown, to increase the pressure to the desired value. The low molecular weight hydrocarbon polymers condensed into a liquid fraction in monomer stripper 10 are withdrawn therefrom through line 11 and at least a portion thereof is recycled to polymerization reactor 7 by connecting line 11 with line 12. Line 12 containing valve 13 for control purposes, conveys said liquid fraction into the top of polymerization reactor 7 where the cool liquid acts as a coolant for reactor 7 in removing the exothermic heat of reaction. In order to maintain the desired fractionation in monomer stripper 10, at least a portion of the liquid fraction removed through line 11 is diverted by means of pump 16 into line 14, containing valve 15 and charged into reboiler 17 where the temperatures of said liquid hydrocarbons are raised sufficiently to provide for the necessary fractionation in stripper 10. Reboiler 17 is usually a heat exchange apparatus, the heating fluid being introduced therein through line 18 and exiting the reboiler through line 19. The heated hydrocarbon recycle is returned to monomer stripper 10 by way of line 20 which conveys the hydrocarbons to said stripper at a point therein intermediate between the uppermost and lowermost plates. A portion of the liquid polymers separated in stripper 10 is desirably drawn-off from the process flow to remove conjunct polymerization products formed in the polymerization reaction which if allowed to remain in the process flow accumulated in amount sufficient to dilute the reactants and adversely affect the polymerization process. For the purpose of removing said hydrocarbons from the system, line 21 containing valve 22 is provided, the amount removed being sufficient to prevent an excessive buildup in the process flow.

The light hydrocarbons separated in monomer stripper 10 which remain in the vapor state and contain unconverted propylene, propane and possibly other hydrocarbons, depending upon the temperature at which stripper 10 is operated, are removed through line 23 connecting with condenser 24 wherein hydrocarbons of greater molecular weight than the C₃ fraction are liquefied. The hydrocarbons thus liquefied are withdrawn through line 25 containing valve 26 and conveyed therethrough into storage vessel 27. The uncondensed C₃ fraction is removed in the gaseous state from vessel 27 through line 28, containing valve 29 and recycled via connecting line 28' to monomer charging line 1, wherein the C₃ fraction is admixed with the monomer charge introduced through line 1. Since the C₃ fraction recovered from settler 27 contains a higher proportion of propane than the C₃ charging stock, the recycle of this fraction provides a convenient means for diluting the propylene contained in the charging stock and provides a means for controlling the temperature in polymerization reactor 7. It has been observed that the exothermic reaction resulting from the polymerization of propylene causes the temperature in the polymerization reactor to increase too rapidly and to a value higher than the optimum when undiluted propylene is charged thereto. The above mentioned recycling operation thereby provides means for limiting the temperature developed in the polymerization reactor by diluting the propylene charge. Excess recycle may be withdrawn from line 28 through a valve 28'' in controlled amounts.

The condensed hydrocarbon fraction accumulating in storage vessel 27 may be withdrawn therefrom through line 30 by pump 31 and either recycled to monomer stripper 10 through line 32 containing valve 33 to provide liquid reflux in monomer stripper 10, or the hydrocarbons may be withdrawn from the process through line 34 and valve 35. Water vapor introduced into the system with the propane-propylene charge is condensed in condenser 24 and may be drawn-off from vessel 27 through line 36 and valve 37.

The primary liquid phase formed in polymerization reactor 7 by polymerization of the propylene monomer charge, as heretofore indicated, accumulates in the bottom of the reactor to form a liquid layer therein. The latter is withdrawn in controlled amounts, as indicated by liquid level control 7', preferably as a continuous stream, through line 38, the rate of withdrawal being controlled by valve 39. The liquid fraction as withdrawn from reactor 7 is charged into polymer stripper 40 wherein the low molecular weight polymers are separated from the desired polymer and other polymers of higher molecular weight. Stripper 40 is usually a fractional distillation column either containing bubble plates or a packing material of the type commonly used in fractionation units to obtain liquid-vapor contact therein. Depending upon the boiling points of the polymers removed as a bottoms fraction from the column, polymer stripper 40 may be operated at atmospheric, subatmospheric or superatmospheric pressures but preferably the operation is effected at a subatmospheric pressure to reduce the boiling point of the polymers separated therein. Polymers of lower molecular weight than desired as the ultimate product are removed from stripper 40 as a vapor phase through line 41 and are cooled in condenser 42 to form a liquid fraction, the latter being removed from condenser 42 through line 43 containing valve 44 and are conveyed therefrom into storage tank 45. At least a portion of the condensed liquid polymers stored in vessel 45 are desirably returned to polymer stripper 40 to provide a liquid reflux therefor. For this purpose, controlled quantities thereof are removed by means of pump 48 through line 46 containing valve 47 and are conveyed by connection of line 46 with line 49 containing valve 50 to polymer stripper 40, entering said stripper at a point corresponding to an upper plate in the fractionator. The remaining portion of the condensed liquid polymers not recycled to polymer stripper 40 as liquid reflux is recycled, according to the invention herein provided, to polymerization reactor 7 wherein said low molecular weight polymers are polymerized further with additional propylene monomer to form increased yields of the desired polymer product. The portion thus recycled may be conveyed by means of line 51 which connects with line 46 leading from polymer storage vessel 45 into monomer charging line 1. The flow of polymer recycle into line 1 is controlled by valve 52 located in line 51. Under this flow arrangement, the polymer recycle is carried by means of the fresh monomer charging stock into charge heater 3 wherein the liquid portion of the charge is heated, vaporized therein, and conveyed through line 6 into polymerization reactor 7.

In an alternative recycle flow, generally preferred for the present operation, the polymer recycle is transferred from line 51 into line 53 and is pumped through valve 54 by means of pump 55 into the upper portions of the polymerization catalyst bed contained in reactor 7. The liquid polymers thus recycled into reactor 7 provides additional means for cooling the upper portions of polymerization reactor 7 and, in general, reduces the temperature of reactor 7. A portion of the polymer fraction may also be withdrawn from the process flow by diverting the polymers from line 51 through line 56 in regulated amounts through valve 57, the latter provision generally being for the purpose of withdrawing high molecular weight conjunct polymerization products from the process flow.

The high boiling polymer fraction separated in polymer stripper 40 which contains the desired propylene polymer product as a bottoms fraction therein are withdrawn from stripper 40 through line 58 containing valve 59 into storage or to auxiliary fractionating equipment not shown on the diagram for separating desired polymers from higher boiling products. It is desirable for proper operation of polymer stripper 40 that a portion of the high boiling fraction be separately heated and returned to stripper 40 at a high temperature to provide a source of heat for reboiling purposes. To this end, a portion of the high boiling bottoms fraction removed from stripper 40 through line 58 is diverted into line 60 through valve 61 by means of pump 62, supplying reboiler 63 with the desired quantity of liquid for reboiling purposes. The heat exchange medium is supplied to reboiler 63 through line 64 and is discharged from the reboiler through line 65. After obtaining the proper temperatures necessary for the operation of column 40, the hydrocarbons are conveyed from reboiler 63 through line 66 to polymer stripper 40 and enter the latter column at a point where reboiling may be effected therein.

Instead of 3 individual units of apparatus designated in the accompanying diagram of polymerization reactor 7, monomer stripper unit 10 and polymer stripping unit 40, it is also within the scope and contemplation of the present invention to effect the respective polymerization and separation stages of the process in an apparatus comprising a combination of the individual units into a single unit or a composite of said individual units. Thus it is feasible to combine polymerization reactor 7 and polymer stripping unit 10 into a single vessel containing in the lower portion thereof the required number of bubble plates or volume of packing material to effect separation of the desired polymer and higher boiling products from the lower polymers. The latter low molecular weight polymers, under such a system of operation, would remain in vapor state and would be continuously and directly vaporized from the polymer stripping zone into the portion of the apparatus containing the polymerization catalyst. The high polymers formed in the polymerization zone, if of sufficient molecular weight to liquefy at the prevailing conditions maintained in the polymerization reactor would join the downward flowing stream of liquid polymers entering the lower portion of the apparatus or the polymer stripping zone. If on the other hand, the resultant polymers remain in the vapor state (that is, they do not attain a sufficiently high molecular weight by condensation with additional monomer to liquefy) said polymers continue to rise in the polymerization catalyst bed until they enter the relatively cool upper portion of the catalyst bed where they liquefy and join the downward flowing stream of polymers. Under this system of operation, the polymers boiling below the boiling point of the desired product remain in the polymerization zone until by further condensation with fresh monomer entering said zone or with other polymers present in the reaction zone they attain the desired molecular weight to remain in the liquid state at the relatively high temperatures in the lower portion of the polymerization catalyst bed. The combination, polymerization reactor and polymer stripping zone possesses the advantage of requiring less heat to maintain the zones in effective operation since the vapors from the polymer stripper are transferred directly and continuously into the polymerization zone and need not be cooled and liquefied to separate the recycled polymers.

Another type of combination apparatus utilizable in the present process is the apparatus represented as a single continuous unit comprising a monomer stripping section, the polymerization reactor and the polymer stripping section in a single unit of apparatus maintained at a uniform pressure throughout and at a temperature gradient of a relatively high value in the lower portion of the apparatus, wherein the polymer stripping operation occurs and a relatively low temperature in the upper portion of the apparatus wherein the monomer stripping operation occurs. Under this method of operation, the polymerization zone containing a supported catalyst section would occupy an intermediate position between the polymer stripping section at the bottom of the apparatus and the monomer stripping section at the top of the unit. Although heat consumption would be at a minimum for this type of unit, the operation would also be characterized by inherent difficulties in maintaining the operating conditions at the particular optimum for each section. The preferred apparatus for the operation of the process specified in the present invention is represented by the above diagrammatic drawing, since each section may be operated at the particular optimum conditions for the operation to be effected, independent of the conditions maintained in other sections of the apparatus. Although the consumption of utilities is somewhat greater than in the combination apparatus, the advantages of maintaining the efficiency of each section at its maximum would outweigh the advantages obtained by the reduction in utility consumption.

The results obtainable by means of the present invention are further illustrated in the following example although the example is not intended to limit the generally broad scope of the invention in accordance thereto.

*Example*

A propylene tetramer fraction is formed by polymerizing a propylene-containing hydrocarbon fraction over a fixed bed of solid phosphoric acid catalyst by means of the following procedure:

The $C_3$ hydrocarbon fraction containing 31% propylene, 65% propane, 2.5% butenes and about 1.5% $C_4+$ hydrocarbons to which may be added about 0.5% moisture, is heated to a temperature of approximately 230° C. and charged at a pressure of 900 pounds per square inch gage into a fixed bed catalytic reactor containing said solid phosphoric acid catalyst. The gaseous effluent of the reactor recovered therefrom at a temperature of about 205° C. is passed into a water-cooled condenser wherein a liquid hydrocarbon fraction consisting largely of propylene dimer separates. The latter liquid hydrocarbon fraction is withdrawn and recycled to the top of the catalyst bed in the polymerization reaction zone. The above gaseous effluent, herein referred to as the primary vapor phase, condensed into a liquid fraction is usually allowed to accumulate in a storage vessel before recycling to the polymerization reactor in order to draw off condensed moisture introduced with the charge. The uncondensed portion of the gaseous effluent is in part recycled to the reactor by combining the gases with the fresh $C_3$ hydrocarbon charge, thereby increasing the percentage of propane in the starting material and diluting the propylene.

At the temperature and pressure conditions utililized for the operation of the polymerization reactor, a liquid fraction is formed therein which accumulates at the bottom of the reaction chamber below the catalyst bed. Said liquid fraction at a temperature of about 290° C. is withdrawn from the bottom of the reactor and passed into an auxiliary fractionating column or polymer stripper operated at approximately atmospheric pressure wherein a high boiling bottoms fraction is separated from a vapor fraction containing low molecular weight polymers. The latter fraction leaving the stripper at a temperature of about 275° C., which analysis indicates to contain mostly propylene trimer, is cooled and condensed into liquid polymers which are recycled to the top of the catalyst bed in the polymerization reactor. The polymer recycle represents about 300 weight percent of fresh $C_3$ charge to the polymerization reactor.

The liquid bottoms fraction from the stripper when further separated in a fractional distillation column into hydrocarbons of specific boiling range contains 86% by weight of hydrocarbons boiling within the propylene tetramer range of 180° to about 210° C., the remaining hydrocarbons being higher molecular weight polymers boiling above about 210° C. The yield of propylene tetramer fraction represents about 75% of the propylene contained in the charge converted to polymers.

We claim as our invention:

1. A process for producing an olefinic polymer of the formula: $(C_nH_{2n})_x$ wherein $n$ represents a whole number from 3 to 5 inclusive and $x$ represents an integer greater than 2, which comprises polymerizing an olefinic monomer represented by the formula: $C_nH_{2n}$, in the presence of a solid polymerization catalyst at reaction conditions such that both a primary liquid phase and a primary vapor phase are present in the polymerization reactor, separately removing said phases from the zone of polymerization stripping from said primary liquid phase polymers of the formula $(C_nH_{2n})_{x-y}$, where $y$ is a whole number less than $x$, passing said last mentioned poylmers into said polymerization reactor, cooling said primary vapor phase to condense hydrocarbons less volatile than said olefinic monomer and returning said hydrocarbons to said polymerization reactor.

2. The process of claim 1 further characterized in that said olefinic monomer is propylene.

3. The process of claim 1 further characterized in that said solid polymerization catalyst is a phosphate-containing catalyst.

4. The process of claim 1 further characterized in that said polymerization catalyst is a solid phosphoric acid cataylst consisting of a calcined composite of a siliceous material and a phosphoric acid.

5. A process for the production of propylene tetramer which comprises polymerizing a propylene-containing hydrocarbon fraction in the presence of solid phosphoric acid catalyst at reaction conditions such that both a primary liquid phase and a primary vapor phase are present in the polymerization reactor, stripping from said primary liquid phase propylene polymers having a molecular weight less than said tetramer, passing said last mentioned polymers into said polymerization reactor, recovering propylene tetramer from said primary liquid phase, cooling said primary vapor phase to condense therefrom propylene polymers less volatile than propylene-propane, and returning said polymers less volatile than propylene-propane to said polymerization reactor.

6. The process which comprises polymerizing a propylene-containing hydrocarbon fraction in the presence of a fixed bed of solid polymerization catalyst at conditions of pressure and temperature such that a primary liquid phase and a primary vapor phase are present in the polymerization reactor, separating said primary liquid phase and stripping therefrom propylene polymers boiling at a temperature lower than the boiling point of propylene tetramer, liquefying said propylene polymers and recycling at least a portion thereof to the top of the catalyst bed in said polymerization reactor, separating said primary vapor phase, liquefying hydrocarbons contained therein less volatile than propane-propylene and returning at least a portion of said liquefied hydrocarbons to the upper portion of said polymerization reactor.

7. The process which comprises polymerizing a propylene-containing hydrocarbon fraction in the presence of a solid polymerization catalyst at conditions of temperature and pressure such that a primary liquid phase and a primary vapor phase are present in the polymerization reactor, separating said primary liquid phase and stripping therefrom propylene polymers boiling at a temperature below the boiling point of propylene tetramer, liquefying said propylene polymers and recycling at least a portion thereof with fresh propylene-containing hydrocarbon fraction into said polymerization reactor, separating said primary vapor phase, liquefying hydrocarbons contained therein less volatile than propane-propylene and returning at least a portion of said liquefied hydrocarbons to the upper portion of said polymerization reactor.

8. The process which comprises polymerizing an olefinic hydrocarbon fraction, a major proportion of which comprises butylenes in the presence of a solid polymerization catalyst at conditions of temperature and pressure such that a primary liquid phase and a primary vapor phase are present in the polymerization reactor, separating said primary liquid phase and stripping therefrom butylene polymers boiling at a temperature below the boiling point of butylene trimer, liquefying said butylene polymers and recycling at least a portion thereof to said reactor, separating said primary vapor phase, liquefying hydrocarbons contained therein less volatile than butylene-butane and returning at least a portion of said liquefied hydrocarbons to the upper portion of said polymerization reactor.

HARRISON C. MAYLAND.
CLARENCE G. GERHOLD.

REFERENCES CITED

The following references are of record in the file of this patent:

UNITED STATES PATENTS

| Number | Name | Date |
|---|---|---|
| 2,176,354 | Nelson | Oct. 17, 1939 |
| 2,245,143 | Gerhold | June 10, 1941 |
| 2,314,458 | Stahly et al. | Mar. 23, 1943 |
| 2,332,298 | Clarke et al. | Oct. 19, 1943 |
| 2,348,836 | Nagle | May 16, 1944 |
| 2,396,753 | Rosen et al. | Mar. 19, 1946 |